Aug. 21, 1956     L. S. BOHL ET AL     2,759,692
CONNECTION FITTING FOR TUBULAR MEMBERS OF BALLOONS
Filed Sept. 13, 1954
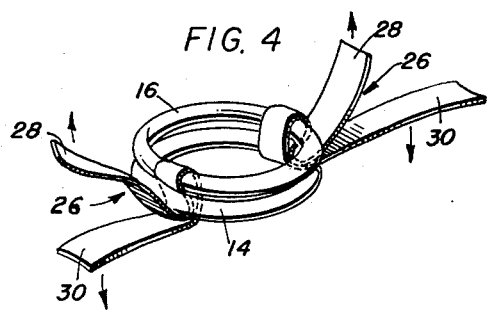
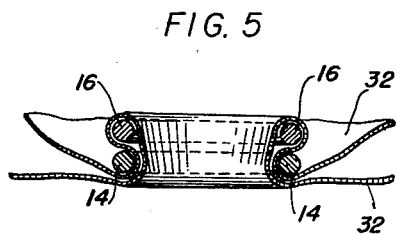
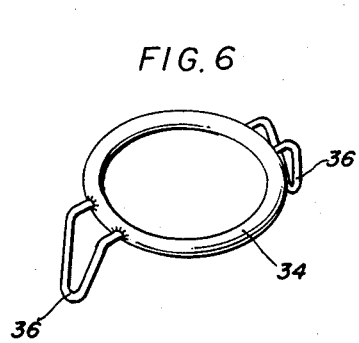
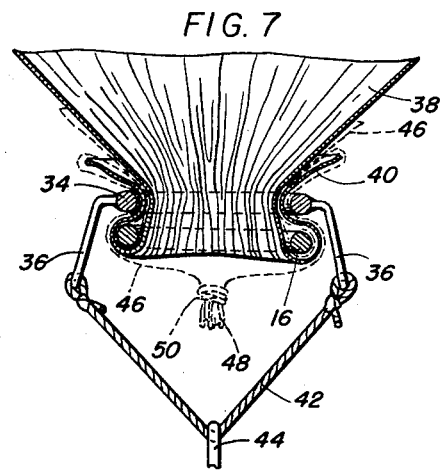
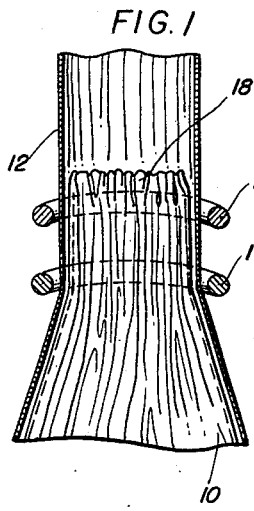
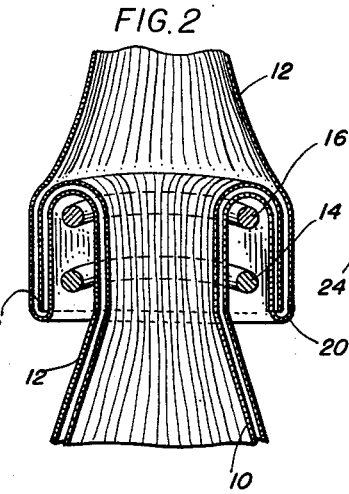
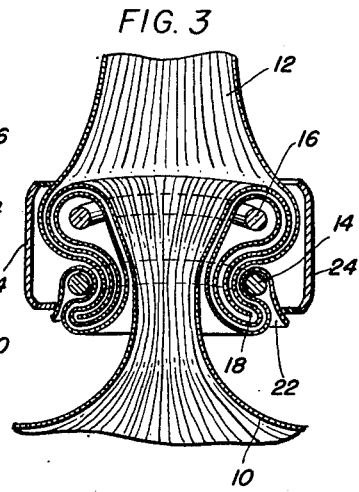
INVENTORS:
LELAND S. BOHL
WILLIAM F. HUCH
BY
ATT'YS

United States Patent Office 2,759,692
Patented Aug. 21, 1956

2,759,692

CONNECTION FITTING FOR TUBULAR MEMBERS OF BALLOONS

Leland S. Bohl, Minneapolis, and William F. Huch, St. Paul, Minn., assignors, by mesne assignments, to the United States of America as represented by the Secretary of the Navy Application September 13, 1954, Serial No. 455,805

9 Claims. (Cl. 244—127)

This invention relates in general to fittings for connecting a pair of plastic tubes together for transferring a load from one tube to the other and for making a fluid-tight fitting at the joint. The invention is more particularly described as a double ring for connecting the top or bottom of a plastic balloon to a tubular member which may be a gas seal, an inflated tube, or a balloon appendix.

The top and bottom ends of plastic free balloons made of polyethylene and similar materials present an unusual design requirement since the radial forces in this thin fabric must be effectively passed through the axis to the fabric on the other side, and the fabric must be firmly secured. The design of such a fitting is made more difficult if there is a requirement for a duct or an opening into the gas container at the point of connection. It is also a particular requirement that any fitting for this purpose may be of suitable weight for flight purposes.

An important object of the invention is to provide a light-weight positive fitting which is easy to construct and to install.

A further object of the invention is to provide a fitting which is adapted to interlock two plastic foldable tubes to provide an effective gas barrier.

A still further object of the invention is to provide a fitting for attachment to a balloon for external load-carrying purposes.

Other objects of the invention will appear in the specification and will be apparent from the accompanying drawings in which Figs. 1, 2, and 3 illustrate in section successive steps in accordance with this invention in the attachment of two opposite tubular extremities, one of which may be the top or bottom of a balloon and the other may be for a gas seal, an inflated tube, or a balloon appendix;

Fig. 4 is a perspective view illustrating the interlocking principle of double rings as applied in accordance with this invention;

Fig. 5 is a sectional view of double rings as applied to a tubular structure;

Fig. 6 is a perspective view of a load-bearing ring; and

Fig. 7 is a sectional view of a load-bearing ring forming one of the double ring tubular connecting fittings in accordance with this invention in connection with a gas seal at one end of the balloon and the attachment of a load to a load-bearing ring.

The double ring fittings in this invention may be of different sizes depending upon the size of the balloon or the tubular parts to be connected thereby, and if used with plastic balloons, they may be of light weight plastic materials or light weight metals and must have sufficient strength to withstand radial fabric tension which may become quite large in a superpressure balloon. In fact, a light-weight retaining band may be necessary in some cases to maintain the rings and the fabrics in position until the predetermined forces are applied.

Referring now more particularly to the drawings, the present invention is described as applied to plastic load balloons constructed of polyethylene or other similar material made with a plurality of gores which terminate at the top or bottom, and sometimes at both ends, in a tubular extremity 10 which it is desirable to seal at the open end or to connect it to another tubular extremity 12, such as an inflater tube or a balloon appendix. The tubular portion 10 of the balloon is thus formed of gores which are connected and reinforced by tape and adapted to be gathered within the tubular extremity 12 which may be of material similar to the balloon fabric or it may be made of other plastic or fabric material which is easily gathered and folded for insertion within the reduced neck of the balloon or to receive the reduced neck of the balloon therein.

As shown in Figs. 1 to 3, the reduced neck of the balloon which comprises the tubular extremity 10 is inserted within the end of the tubular extremity 12 by gathering and folding the neck of the balloon and inserting the material of both extremities 10 and 12 within two ring fittings 14 and 16. These fittings are of a diameter to receive the tubular extremities closely therein, and one end 18 of the balloon extremity after being pulled through the rings 14 and 16 is included and extended in an outer loop 20 of the tubular extremity 12 as shown in Fig. 2 and folded outwardly over one or both of the rings 14 and 16.

This looped portion 20 with the end 18 of the balloon extremity 10 is then extended to pass around the outside of one of the rings 16 and under or beneath the other ring 14 as shown in Fig. 3, and an end 22 of the opposite tubular extremity 12 is looped over the outside of the ring 14 to form the termination, if desired, of the tubular extremity 12.

To complete the connection between the tubular extremities, the rings 14 and 16 are pressed tightly together, and this may be effected by pulling on the opposite tubular extremities 10 and 12 which will clamp the folds of the fabric together without the fabric slipping from their folded positions between the rings, and the more tightly they are pulled about, the more tightly the rings will be drawn together, thus forming an effective gas barrier and a complete interlock between the tubular extremities. A light-weight retaining band 24 of suitable metal in the nature of a split hose retaining clamp may be applied over the joint thus made.

The self-locking action of the pair of rings 14 and 16 is more clearly illustrated in Figs. 4 and 5. A pair of tapes 26 may be passed around the rings in the manner of the folding of the end of the tubular extremity 10 or 12, and by pulling oppositely upon the corresponding ends 28 and 30 of the opposite tapes, as represented by the arrows in Fig. 4, the rings 14 and 16 are drawn more tightly together. This same feature is applied to the rings by a continuous tubular member 32 which is extended from around above the lower ring 14 and outwardly around the outside of the upper ring 16 and then the tubular member passes within the two rings 14 and 16 and outwardly below the ring 14. This represents the tubular extremity of a balloon neck or an enveloping casing therefor, as in Fig. 3, and when two tubular extremities, as shown in Fig. 3, are connected together in the same manner, they will cause additional frictional engagement providing a thorough interlock and an effective gas seal or barrier between the tubes. If it is desired to carry a load, the weight may be effectively distributed by means of a ring 34 having opposite hooks 36 secured thereto by welding or suitable means. In attaching this load ring 34 to the lower end of a balloon 38, the load ring 34 constitutes one of the ring fittings which may be of the same size as one of the ring fittings 16. A reduced neck 40 of the balloon is passed from the inside around the outside of the ring fitting 16 and at the inside and outwardly from the load ring 34.

When the rings are drawn tightly together, the load ring 34 will be clamped tightly to the balloon, the load will be equalized by the ring 34, and a weight may be suspended by a cable 42 engaging the opposite hooks 36 extending through a load supporter 44.

To seal the open end of a balloon 38, a sleeve 46 may be applied over the end of a reduced neck 40 and assembled with rings 16 and 34 (or with rings 14 and 16 as previously set forth), and the outer end 48 of this sleeve may be puckered or gathered and sealed by a tight wrapping 50 or any other suitable fastening means.

With this construction, the upper or lower end of a balloon may be effectively and quickly sealed with the same material of which the balloon is made or with some other material in tubular form having an extremity which may be firmly closed.

While a preferred embodiment has been described in some detail, it should be regarded as an example or embodiment of the invention and not as a restriction or limitation therein as many changes may be made in the construction and arrangement of the parts without departing from the spirit and scope of the invention.

We claim:

1. The combination of a pair of tubular members and a pair of rings of substantially the same size adapted to receive therethrough one tubular member extending within the other and providing an extremity of one of the members which may be looped on the outside of the rings in a corresponding fold of the other member, this fold extending over the outside of the ring adjacent thereto and within the other ring to the outer side thereof, the rings being movable tightly together to compress the folds of the tubular members together and to make a fluid-tight joint between them.

2. The combination in accordance with claim 1 in which the other end of the tubular member which has its one end included in the fold of the other tubular member is gathered and drawn together and sealed tightly at the end providing a fluid-tight seal for the connected extremity of the other tubular member.

3. A balloon end fitting comprising a reduced tubular balloon neck which may be gathered and drawn together throughout a considerable portion of its length adjacent the end, a tubular sleeve fitting over the end of the balloon neck, a pair of rings through which the neck and the sleeve are gathered and inserted, the end of the balloon neck being engaged in an outwardly extending fold of the sleeve and turned reversely over the outside of the adjacent ring and inwardly over the inside of the other ring to clamp the end of the balloon neck and the fold of the sleeve tightly between the two rings when they are drawn together, the rings being drawn together when pressure is applied to the sleeve and balloon neck at opposite ends of the rings.

4. A tubular attachment fitting for balloons in accordance with claim 3 having load extension hooks at opposite sides of the said other one of the rings which project outwardly over and free from said adjacent ring and over the neck and sleeve portions looped about the said adjacent ring.

5. In a balloon fitting in accordance with claim 3, the sleeve having a free extremity at the end of the balloon neck opening adapted to be gathered and fastened tightly together and a closable seal for the end of the balloon.

6. In a balloon attachment fitting in accordance with claim 3, the said rings and folds being drawn tightly together, and a retaining band extending tightly over and beyond the ends of the connected rings and tubular members.

7. The method of connecting a pair of tubular members for continued gas-type connection which comprises inserting one member within the other, inserting the two tubular members through a pair of similar rings, including the end of the first member in an outwardly extending fold of the other member, passing this fold containing the said end over the outside of the ring adjacent thereto and continuing to extend the outer portion of the fold below and around the next adjacent ring so that the folded portions extend oppositely between the said rings.

8. The method of connecting a tubular extension to the end of a balloon which comprises gathering the tubular end of the balloon into a compact flexible member, inserting the gathered end of the balloon into a tubular sleeve, turning the extremity of the gathered end of the balloon outwardly in a fold of the tubular sleeve, inserting the end of the balloon and the tubular sleeve through a pair of rings before the fold is formed so that the fold will be at the outside of one of the rings, and extending the fold over and around said one ring and inserting the outer end of the fold under and beneath the inner periphery of the other ring so that pressure upon either the sleeve or the balloon will cause the rings to be drawn tightly together gripping the balloon end and the sleeve therebetween.

9. The combination of a flexible tubular member and a pair of rings of substantially the same size through both of which a contracted portion of said member extends, a second portion of said member extending from said contracted portion and being folded outward over one of said rings and extending inward between said rings and at the inner periphery of other ring and outside of and adjacent said contracted portion, so that said second portion has a cross-section substantially in the shape of an S, whereby a pull tending to straighten said shape will draw said rings toward each other and clamp the part of said portion located between said rings.

References Cited in the file of this patent

UNITED STATES PATENTS

| 1,861,296 | Braly | May 31, 1932 |
| 2,003,918 | Brown | June 4, 1935 |
| 2,433,930 | Speer | Jan. 6, 1948 |
| 2,444,642 | Frieder | July 6, 1948 |

FOREIGN PATENTS

| 482,657 | Canada | Apr. 22, 1952 |
| 592,474 | Germany | Feb. 10, 1934 |